(No Model.)  3 Sheets—Sheet 1.
L. H. NASH.
METHOD OF OPERATING GAS ENGINES.
No. 341,935. Patented May 18, 1886.
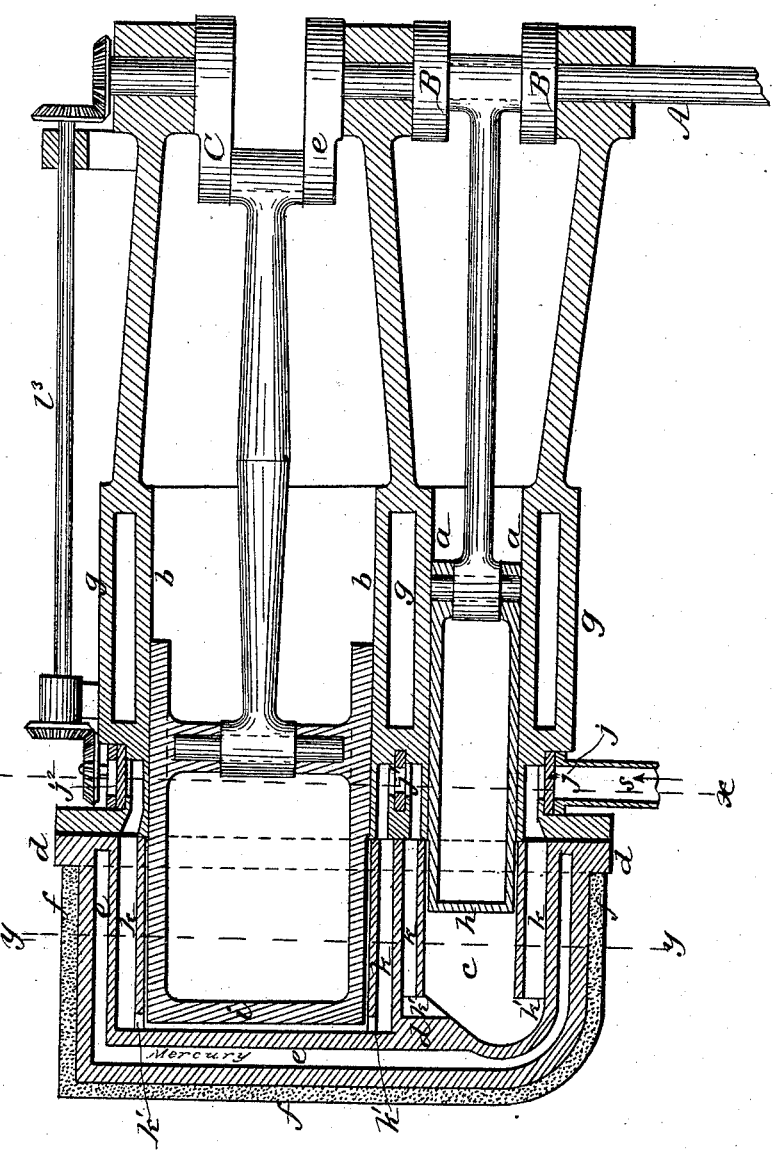
WITNESSES
INVENTOR

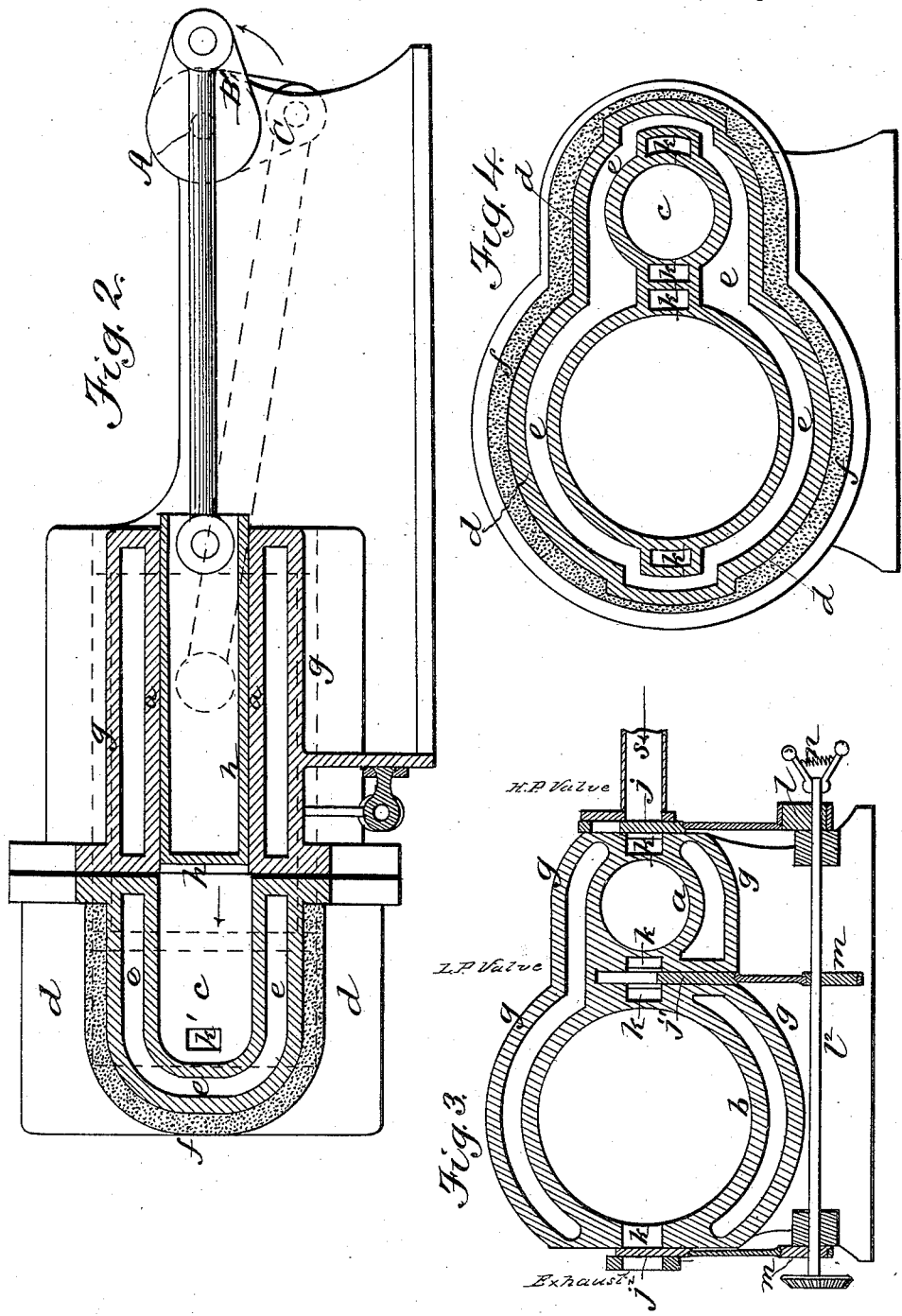

(No Model.) 3 Sheets—Sheet 3.
L. H. NASH.
METHOD OF OPERATING GAS ENGINES.
No. 341,935. Patented May 18, 1886.
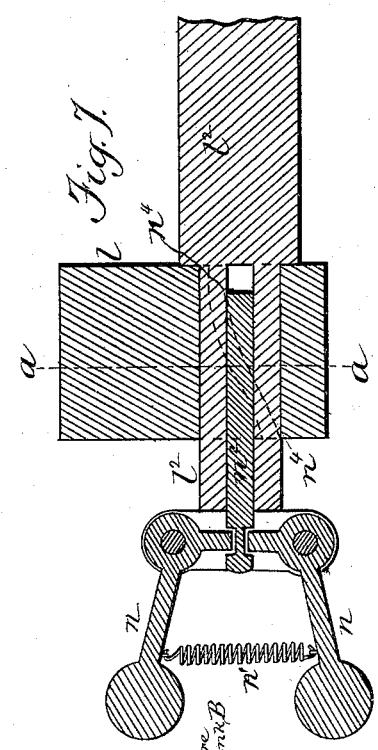
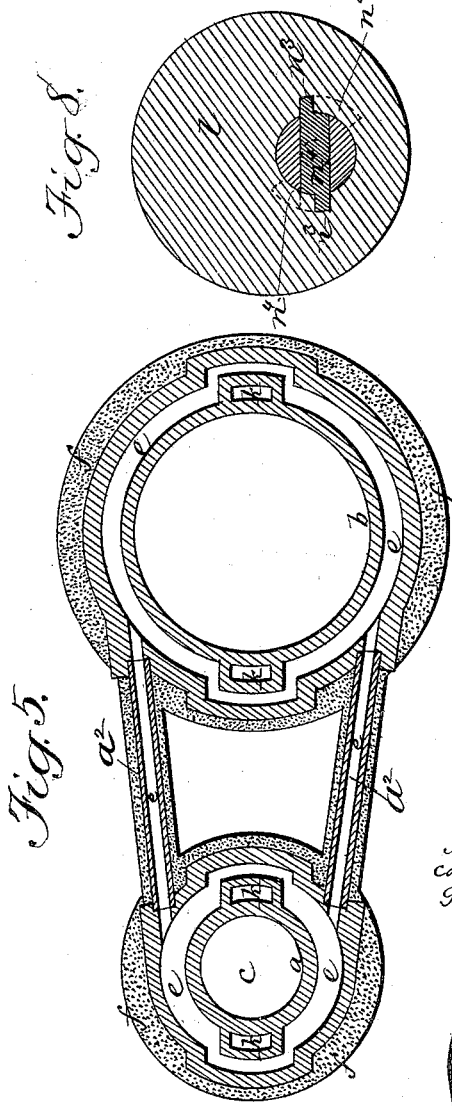
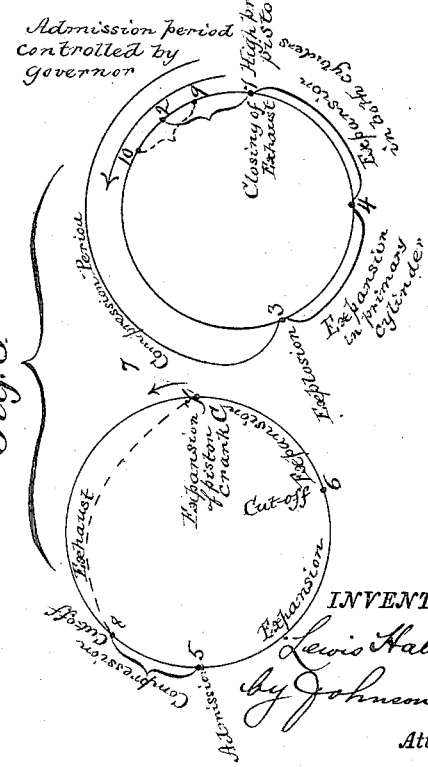
WITNESSES
Bessie P. Johnson.
R. E. Grant
INVENTOR
Lewis Hallock Nash
By Johnson and Johnson
Attorneys.

UNITED STATES PATENT OFFICE.

LEWIS HALLOCK NASH, OF BROOKLYN, ASSIGNOR TO THE NATIONAL METER COMPANY, OF NEW YORK, N. Y.

METHOD OF OPERATING GAS-ENGINES.

SPECIFICATION forming part of Letters Patent No. 341,935, dated May 18, 1886.

Application filed September 23, 1885. Serial No. 177,944. (No model.)

*To all whom it may concern:*

Be it known that I, LEWIS HALLOCK NASH, a citizen of the United States, residing at Brooklyn, in the county of Kings and State of New York, have invented new and useful Improvements in Methods of Operating Gas-Engines, of which the following is a specification.

The objects of my improvements are to operate a gas-engine with a highly-compressed charge, to utilize the primary expansive force of the charge in the ignition-cylinder, and to continue the force of such expansion as a secondary power in a coacting cylinder of greater capacity; to utilize the waste heat of the primary cylinder to heat the cylinder of a secondary power, and to prevent the loss of the heat from the hot gases. The exploding of the charge in a comparatively small cylinder and expanding it in a larger cylinder causes the intensely high pressure of the gases at ignition to act upon a comparatively small piston, and therefore the piston connecting mechanism and the bearings are released from injurious pressure. The power of the gases under such high pressure, instead of being exerted through a very short movement of a large piston, is exerted upon the small piston during a much longer portion of the stroke, whereby the force exerted by the engine is much more uniform, instead of being subjected to a series of short and intense impulses, as in gas-engines. It is these sudden and intense impulses that are so destructive to the wearing parts of the gas-engine, and which require such engines to be constructed of great weight and strength of connections as compared with the power developed.

Another advantage of exploding the charge in a small cylinder and continuing its expansion in a larger cylinder is, that the expansion in the larger cylinder absorbs the heat given out in the primary cylinder.

I utilize a peculiar method of admitting the charge to govern the engine in connection with the method of expanding the charge.

The accompanying drawings illustrate an engine organized for carrying out my improved methods of operation, in which—

Figure 1 represents a horizontal longitudinal section taken centrally through the coacting power-cylinders, showing the primary piston on its forward stroke and the secondary piston ready to receive the expanding gases from the primary cylinder; Fig. 2, a vertical longitudinal section taken through the primary power-cylinder, showing the piston at the beginning of its back-stroke, and also showing the secondary piston in position in dotted lines on its forward stroke; Fig. 3, a cross-section taken on the line $x\,x$ of Fig. 1, showing the position of the valves; Fig. 4, a similar section taken on the line $y\,y$ of Fig. 1, showing the heat-conducting jacket of the co-acting cylinders; Fig. 5, a similar section showing the heat-conveying passages of the two cylinders when the latter are separated from each other; Fig. 6, a diagram showing the path of the two cranks and the action of the gases in each cylinder; Fig. 7, a longitudinal section of the governor, showing its connection with the eccentric; and Fig. 8, a cross-section of the same on the line $a\,a$ of Fig. 7.

I construct the engine of two cylinders, $a$ and $b$, which I denominate the "primary" and "secondary" power-cylinders. The primary cylinder forms the combustion-chamber $c$, and is of less capacity than the chamber of the secondary cylinder, with which it has valved communication, as hereinafter described.

The cylinders are preferably cast together, and form the bearings for the pistons, while the chambers in which the charge operates are preferably cast in the separate cap-piece $d$, which is secured to and forms an extension of the cylinders. This cap or hood has an enveloping space, $e$, formed within its walls, in which a heat-conveying fluid—such as quicksilver or other substance—is placed and caused to circulate by the heat from the combustion-chamber. This cap or hood is enveloped by a non-conductor, $f$, for retaining the heat. At the joining of the chambered cap with the cylinders there is a thick packing, to prevent the conduction of the heat to the bearing-cylinders. By this heat-conveying medium the combustion-chamber is prevented from being unduly heated, as the waste heat is taken up from it and conveyed to the secondary cylinder and utilized to increase the expansive force of the gases therein contained, whereby a large economy of power is obtained. The pistons $h$ and $i$ of the respective chambers operate free of the walls thereof, and therefore are not heated to any extent by the combustion of the charge. The bearing-cylinders are formed with a cooling-jacket, $g$; but by the construction of the separate hood for the hot gases the bearing-cylinders may not need a cooling-jacket. The pistons $h$ and $i$ are preferably of trunk form, and are connected to the crank-shaft, as shown in Figs. 1 and 2. The engine-valves $j\ j'\ j^2$ are arranged upon the cool cylinders, and passages $k$ lead from the valves into and through the walls of the hood or cap, and open at $k'$ into the combustion-chambers back of the pistons, through which the charges are admitted into and discharged from the said chambers. By thus placing the valves in the cool bearing-cylinders, and forming passages leading from them through the hood-extension, I obtain the advantage of valves which are never overheated, and avoid the necessity of cooling the combustion-chamber, which must be done when the valves are formed upon the combustion-chamber.

In engines of large dimensions I prefer to separate the cylinders and maintain the flow of the heat-conveying medium of the cylinders by connecting-pipes $a^2$, which should be covered by non-conducting material, as shown in Fig. 5. The valves are single-admission slide-valves, arranged one at the outer side of each cylinder and one between them, and they are all operated by eccentrics $l\ m$ on a counter-shaft, $l^2$, as shown in Fig. 3. The counter-shaft $l^2$ is operated by a second counter-shaft, $l^3$, driven by bevel-gearing from the crank-shaft A, as shown in Fig. 1. The governor $n$ is carried by the counter-shaft $l^2$, as seen in Figs. 3 and 7, and is of the type known as the "ball" governor, having its balls controlled by a spring, $n'$. The governor-arms engage with a slide, $n^2$, which engages by edge pins, $n^3$, with spiral slots $n^4$, formed in the eccentric $l$, to revolve, and thereby regulate, the action of the supply-valve $j$. The middle valve, $j'$, operates to admit the charge from the primary cylinder into the secondary cylinder, while the valve $j^2$ controls the exhaust, and the valves are operated by eccentrics fixed upon the counter-shaft $l^2$.

The operation of the engine is as follows, viz: The pistons being in the positions shown in Fig. 2, the piston $h$ of the primary cylinder being on its extreme forward stroke, and the supply-valve $j$ just opening, a combustible charge is admitted, under a considerable pressure, to the combustion-chamber $c$ by the pipe $s$ through said valve, the point of such admission being indicated at 1 in Fig. 6, and such admission terminating at 2. From this point the charge is compressed by the back-stroke of the piston to a very high degree. Just after the piston commences its next forward stroke the charge is ignited at 3, and, expanding, drives the piston forward. When it has reached the position shown in Fig. 1, and at 4, Fig. 6, the valve $j'$ opens communication with the chamber of the secondary cylinder, admitting the charge to continue its operation upon the larger piston $i$, which at this movement is at the beginning of its forward stroke, as shown in Fig. 1, and at 5 in Fig. 6. The two pistons are now driven forward by the expansion of the charge until they reach the position shown in Fig. 2 in full and dotted lines, at which time the crank B of the primary piston is at 1, Fig. 6, and the crank C of the secondary piston at 6 in said figure. The valve $j'$ now closes communication between the two cylinders, a new charge is admitted to the primary piston, and at the same time the gases continue to act in the secondary cylinder, forcing its piston to the end of its stroke, as indicated at 7 in Fig. 6. The exhaust-valve $j^2$ now opens, discharging the gases until the crank C reaches the point 8, Fig. 6, when valve $j^2$ closes the exhaust, and the remaining backward movement of the piston fills the clearance-spaces with compressed gases, thus completing the circuit of both cranks.

The governor acts as follows, viz: When the engine is working to its greatest capacity, the governor operates the valve to admit the charge to the primary cylinder at the point 1, Fig. 6, and closes the admission at the point 2, having thus admitted a charge while the piston is on its extreme forward stroke. When less power is required of the engine, the governor operates the valve to open the admission later and closes it later, as indicated by the dotted points 9 10 in Fig. 6, the charge thus being admitted after the piston has completed a portion of its back-stroke into a chamber of less capacity; therefore a lesser charge can be admitted proportioned to the cylinder-space. The governor effects the above operation by its action in rotating the eccentric $l$ through a greater or less arc, and thus causes the supply-valve to open and to close more or less early in the back-stroke of the piston.

The engine in its construction and combinations of coacting heat-transmitting cylinders and coacting power-transmitting pistons is not claimed herein, as such matters form the subject of a separate and distinct application for a patent for improvement in gas-engines filed by me of even date herewith.

I prefer to place the two coacting cranks for the two cylinders in relative positions, as shown in Fig. 2, in which the secondary cylinder receives the pressure of the gases before the primary piston has completed its forward stroke; for by this construction the secondary piston exerts its force upon its crank during the latter part of the stroke of the primary piston, and it accomplishes a large part of its stroke at the time the primary piston has completed its stroke; but I do not limit myself to such relation. I prefer to use quicksilver as the medium of conveying the heat from the combustion around the expansion-chamber.

I claim—

1. The method herein described of governing the speed and power of a gas-engine, which consists in admitting the combustible charge during the back-stroke of the piston and regulating the quantity of the charge by cutting off the admission at different points in the back-stroke of the piston by means of a governor, whereby to regulate the power of the engine.

2. The method herein described of utilizing the waste heat from the combustion-chamber of a gas engine, which consists in expanding the charge in two coacting power-cylinders and conveying the waste heat from the hotter to the cooler power-cylinder by the circulation of the heat-conveying fluid, thereby increasing the expansive force of the gas in the cooler cylinder.

3. The method of utilizing the expansive force of the charge of a gas-engine, which consists in igniting the charge in the combustion-chamber and completing the expansion thereof in an adjacent cylinder-chamber heated by the waste heat of the combustion-chamber, substantially as described, for the purpose specified.

4. The method herein described of operating a gas-engine, which consists in supplying a small cylinder with a combustible charge under compression, further compressing the charge by the back-stroke of the piston, igniting and partially expanding the charge so compressed in said small cylinder, and completing the expansion of the gas in a cylinder of greater capacity, substantially as described.

5. The method herein described of utilizing the waste heat from the combustion-chamber of a gas-engine, which consists in expanding the charge in two coacting cylinders, and conveying the waste heat from the hotter to the cooler power-cylinder through the medium of quicksilver caused to circulate by the heat from the combustion-chamber, as described, whereby to prevent the combustion-chamber from becoming unduly heated and to increase the expansive force of the gases in the cooler power-cylinder.

In testimony whereof I have hereunto set my hand in the presence of two subscribing witnesses.

LEWIS HALLOCK NASH.

Witnesses:
A. E. H. JOHNSON,
J. W. HAMILTON JOHNSON.